United States Patent
Sasaki et al.

(10) Patent No.: US 10,427,565 B2
(45) Date of Patent: Oct. 1, 2019

(54) VEHICULAR SEAT EQUIPPED WITH CUSHION AIRBAG DEVICE, AND CUSHION AIRBAG

(71) Applicants: TOYOTA JIDOSHA KABUSHIKI KAISHA, Toyota-shi, Aichi-ken (JP); TOYODA GOSEI CO., LTD., Kiyosu-shi, Aichi-ken (JP)

(72) Inventors: Akihito Sasaki, Toyota (JP); Ikufumi Matsuba, Nagoya (JP); Tomoyuki Maeno, Nissin (JP); Mitsuyoshi Ohno, Miyoshi (JP); Yoshikazu Tanaka, Kiyosu (JP); Shohei Ota, Kiyosu (JP)

(73) Assignees: TOYOTA JIDOSHA KABUSHIKI KAISHA, Toyota (JP); TOYODA GOSEI CO., LTD., Kiyosu (JP)

( * ) Notice: Subject to any disclaimer, the term of this patent is extended or adjusted under 35 U.S.C. 154(b) by 0 days.

(21) Appl. No.: 15/957,162

(22) Filed: Apr. 19, 2018

(65) Prior Publication Data
US 2018/0319296 A1    Nov. 8, 2018

(30) Foreign Application Priority Data

May 8, 2017 (JP) .................. 2017-092699
Dec. 4, 2017 (JP) .................. 2017-232876

(51) Int. Cl.
*B60N 2/42* (2006.01)
*B60N 2/427* (2006.01)

(52) U.S. Cl.
CPC ....... *B60N 2/42754* (2013.01); *B60N 2/4221* (2013.01); *B60N 2/42763* (2013.01)

(58) Field of Classification Search
CPC .............. B60N 2/4221; B60N 2/42754; B60N 2/42763

(Continued)

(56) References Cited

U.S. PATENT DOCUMENTS 7,527,333 B2 *  5/2009  Suzuki ............... B60N 2/42718
                                                            297/216.1 X
8,573,633 B2 * 11/2013  Kino .................. B60N 2/42763
                                                            297/216.1 X (Continued)

FOREIGN PATENT DOCUMENTS

JP    2009-040327 A    2/2009
JP    2010-052535 A    3/2010

(Continued)

OTHER PUBLICATIONS

U.S. Appl. No. 16/028,721, filed Jul. 6, 2018 in the name of Seiji Hioda.

*Primary Examiner* — Rodney B White
(74) *Attorney, Agent, or Firm* — Oliff PLC

(57) ABSTRACT

A vehicular seat includes: a cushion panel disposed to extend in a seat front-rear direction and to form a bottom portion of a seat cushion; an inflator configured to operate to produce gas, the inflator being provided in the seat cushion; and a cushion airbag configured to expand due to the gas and to push up a range including portions of a seat occupant from thighs to hip points in an expansion end state, the cushion airbag being provided over the cushion panel, in which the cushion airbag is set such that a push-up force in rear right and left regions corresponding to right and left hip joints to right and left lower ischium portions of the seat occupant in the expansion end state is lower than a push-up force in a rear center region present between the rear right and left regions in the expansion end state.

10 Claims, 8 Drawing Sheets

(58) Field of Classification Search
USPC .......................................... 297/216.1–216.2
See application file for complete search history.

(56) References Cited

U.S. PATENT DOCUMENTS

| | | | |
|---|---|---|---|
| 8,641,086 B2* | 2/2014 | Hashido | B60R 21/207 |
| | | | 280/730.1 |
| 8,888,126 B2* | 11/2014 | Nukaya | B60N 2/42718 |
| | | | 297/216.1 X |
| 9,114,743 B2* | 8/2015 | Komamura | B60N 2/42763 |
| 9,126,510 B2* | 9/2015 | Hirako | B60N 2/42763 |
| 9,376,040 B2* | 6/2016 | Fukawatase | B60N 2/4221 |
| 9,604,556 B2* | 3/2017 | Fukawatase | B60R 21/207 |
| 9,731,634 B2* | 8/2017 | Kanto | B60N 2/42763 |
| 10,093,269 B2* | 10/2018 | Kobayashi | B60N 2/42 |
| 2007/0132214 A1* | 6/2007 | Suzuki | B60N 2/42718 |
| | | | 297/216.1 X |
| 2012/0007407 A1 | 1/2012 | Komamura et al. | |
| 2014/0306497 A1* | 10/2014 | Fukawatase | B60R 21/207 |
| | | | 297/216.1 |
| 2014/0346819 A1 | 11/2014 | Fukawatase et al. | |
| 2017/0028960 A1 | 2/2017 | Kobayashi et al. | |
| 2017/0057386 A1* | 3/2017 | Kanto | B60N 2/42763 |

FOREIGN PATENT DOCUMENTS

| | | |
|---|---|---|
| JP | 2012-016970 A | 1/2012 |
| JP | 2013-163452 A | 8/2013 |
| JP | 2017-030446 A | 2/2017 |
| WO | 2013/094027 A1 | 6/2013 |

\* cited by examiner

VEHICULAR SEAT EQUIPPED WITH CUSHION AIRBAG DEVICE, AND CUSHION AIRBAG

INCORPORATION BY REFERENCE

The disclosure of Japanese Patent Application No. 2017-232876 filed on Dec. 4, 2017 including the specification, drawings and abstract is incorporated herein by reference in its entirety.

BACKGROUND

1. Technical Field

The present disclosure relates to a vehicular seat equipped with a cushion airbag device, and a cushion airbag.

2. Description of Related Art

A vehicular seat equipped with a cushion airbag device is known (for example, refer to Japanese Unexamined Patent Application Publication No. 2012-16970 (JP 2012-16970 A), Japanese Unexamined Patent Application Publication No. 2010-52535 (JP 2010-52535 A), WO 2013/094027, Japanese Unexamined Patent Application Publication No. 2013-163452 (JP 2013-163452 A), and Japanese Unexamined Patent Application Publication No. 2017-30446 (JP 2017-30446 A)). For example, JP 2012-16970 A discloses a technique relating to a vehicular seat equipped with a cushion airbag device including: a cushion panel that forms a bottom portion of a seat cushion; an inflator that is provided in the cushion panel; and a cushion airbag that is provided over the cushion panel. In brief, in the related art, the cushion airbag includes: a waist retaining portion that is disposed at a center portion of the cushion panel; and a gas introducing portion that connects the waist retaining portion and the inflator to each other.

According to the related art, in a case where gas is injected from the inflator during a frontal collision of a vehicle, the waist retaining portion of the cushion airbag expands such that the waist of a seat occupant can be effectively pushed up and restrained from moving. That is, in the related art, a so-called submarine phenomenon in which the waist sinks down into the seat cushion can be effectively suppressed.

SUMMARY

As the expansion thickness during the expansion of the cushion airbag increases, portions of the seat occupant from the right and left hip joints to the lower ischium portions are pushed up, and the restraining force applied to the waist during a frontal collision increases. However, the upward movement of the seat occupant also increases. On the other hand, during a frontal collision, the head of the seat occupant tends to stay where it is during the collision due to an inertial force. Therefore, in a case where the upward movement of the seat occupant increases, a load on the neck of the seat occupant may also increase.

The disclosure provides a vehicular seat equipped with a cushion airbag device capable of reducing a load on the neck of a seat occupant while maintaining a restraining force applied to the waist during a frontal collision, and a cushion airbag.

A first aspect of the disclosure relates to a vehicular seat including a cushion panel, an inflator, and a cushion airbag. The cushion panel is disposed to extend in a seat front-rear direction and to form a bottom portion of a seat cushion. The inflator is configured to operate to produce gas and is provided in the seat cushion. The cushion airbag is configured to expand due to the gas supplied from the inflator and to push up a range including portions of a seat occupant from thighs to hip points in an expansion end state and is provided over the cushion panel. The cushion airbag is set such that a push-up force in rear right and left regions corresponding to right and left hip joints to right and left lower ischium portions of the seat occupant in the expansion end state is lower than a push-up force in a rear center region present between the rear right and left regions in the expansion end state.

"Hip point" refers to a rotation center of the torso and a thigh of the seat occupant and refers to a point corresponding to a hip joint of a human body. "Lower ischium portion" refers to a lower portion of an ischium that faces directly downward or substantially directly downward in a front view of the seat occupant, the lower portion being a lower ischium edge or a portion in the vicinity of the lower ischium edge.

According to the first aspect, for example, in a case where a frontal collision of a vehicle is detected or estimated, the inflator operates to produce gas. The cushion airbag expands due to the gas supplied from the inflator and pushes up a range including the portions of the seat occupant from the thighs to the hip points in the expansion end state. Here, the cushion airbag is set such that a push-up force in rear right and left regions corresponding to right and left hip joints to right and left lower ischium portions of the seat occupant in the expansion end state is lower than a push-up force in a rear center region present between the rear right and left regions in the expansion end state. Accordingly, the push-up force of the cushion airbag is applied to a recess portion between the lower ischium portions of the seat occupant, whereas the range of the seat occupant from the hip joints to the lower ischium portions is not strongly pushed up. Therefore, the waist of the seat occupant is restrained from moving while suppressing the upward movement of the seat occupant.

In the vehicular seat according to the first aspect, the cushion airbag may include a front portion that includes portions corresponding to the thighs of the seat occupant, a pair of right and left rear side portions that is set in a range from hip joint corresponding portions that are portions corresponding to the hip joints of the seat occupant to lower ischium edge corresponding portions that are portions corresponding to lower ischium edges of the seat occupant, and a rear center portion that is disposed between the right and left rear side portions. The cushion airbag may be set such that, during the expansion of the cushion airbag in an occupant seated state, upper surfaces of the hip joint corresponding portions of the rear side portions have a step difference from and are lower than an upper surface of a seat width direction center portion of the rear center portion.

According to the first aspect, the cushion airbag includes the front portion that includes portions corresponding to the thighs of the seat occupant. Therefore, the thighs of the seat occupant can be pushed up and restrained from moving by the expanded front portion. The cushion airbag includes the right and left rear side portions and the rear center portion that is disposed between the right and left rear side portions. The right and left rear side portions are set in a range from the hip joint corresponding portions that are portions corresponding to the hip joints of the seat occupant to the lower ischium edge corresponding portions that are portions corresponding to lower ischium edges of the seat occupant.

Here, during the expansion of the cushion airbag in the occupant seated state, the upper surfaces of the hip joint corresponding portions of the rear side portions have a step difference from and are lower than the upper surface of the seat width direction center portion of the rear center portion. Accordingly, the seat width direction center portion in the rear center portion of the cushion airbag is mainly pushed toward the recess portion between the lower ischium edges in the hip bone of the seat occupant, whereas the range of the seat occupant from the hip joints to the lower ischium edges is not strongly pushed up. Therefore, the waist of the seat occupant is restrained from moving while suppressing the upward movement of the seat occupant.

In the vehicular seat according to the first aspect, an expansion thickness of the rear side portions in a seat up-down direction during the expansion of the cushion airbag may be set to be less than an expansion thickness of the rear center portion in the seat up-down direction during the expansion of the cushion airbag.

According to the first aspect, during the expansion of the cushion airbag, the expansion thickness of the rear side portions in the seat up-down direction is set to be less than the expansion thickness of the rear center portion in the seat up-down direction. Therefore, the cushion airbag can be relatively easily set such that, during the expansion of the cushion airbag in the occupant seated state, the upper surfaces of the hip joint corresponding portions of the rear side portions have a step difference from and are lower than the upper surface of the seat width direction center portion of the rear center portion.

In the vehicular seat according to the first aspect, sewn portions or tethers may be provided in right and left side portions of a rear portion of the cushion airbag, the sewn portions or the tethers connecting overlapping portions of the right and left side portions in the seat up-down direction to each other to restrict an expansion thickness of the rear side portions in the seat up-down direction during the expansion of the cushion airbag.

According to the first aspect, the sewn portions or the tethers that are provided in the right and left side portions of the rear portion of the cushion airbag connect overlapping portions of the right and left side portions in the seat up-down direction to each other to restrict the expansion thickness of the rear side portions in the seat up-down direction during the expansion of the cushion airbag. Therefore, the cushion airbag can be relatively easily set with a simple configuration even without devising peripheral structures of the cushion panel and the like such that, during the expansion of the cushion airbag in the occupant seated state, the upper surfaces of the hip joint corresponding portions of the rear side portions have a step difference from and are lower than the upper surface of the seat width direction center portion of the rear center portion.

In the vehicular seat according to the first aspect, the cushion panel may include a panel rear center portion that is a portion corresponding to the rear center portion, and panel rear side portions that are disposed outside of the panel rear center portion in a seat width direction. The panel rear side portions may be positioned further toward a seat lower side than at least a seat width direction center portion of the panel rear center portion.

According to the first aspect, the expansion of the rear side portions of the cushion airbag is allowed further toward the seat lower side than a height position of a surface where the seat width direction center portion of the rear center portion of the cushion airbag is supported by the seat width direction center portion of the panel rear center portion of the cushion panel. Therefore, during the expansion of the cushion airbag, a height position of upper surfaces of the rear side portions of the cushion airbag can be easily adjusted to be lower than a height position of the upper surface of the seat width direction center portion of the rear center portion of the cushion airbag.

In the vehicular seat according to the first aspect, the cushion panel may include a panel rear center portion that is a portion corresponding to the rear center portion, and panel rear side portions that are disposed outside of the panel rear center portion in a seat width direction. The panel rear side portions may be set such that, in a case where the cushion airbag expands in the occupant seated state, the panel rear side portions receive an expansion pressure of the cushion airbag to move down further toward a seat lower side than at least the seat width direction center portion of the panel rear center portion.

According to the first aspect, in a case where the cushion airbag expands in the occupant seated state, the panel rear side portions of the cushion panel receive an expansion pressure of the cushion airbag to move down further toward the seat lower side than at least the seat width direction center portion of the panel rear center portion of the cushion panel. Therefore, during the expansion of the cushion airbag, a height position of upper surfaces of the rear side portions of the cushion airbag can be easily adjusted to be lower than a height position of the upper surface of the seat width direction center portion of the rear center portion of the cushion airbag.

In the vehicular seat according to the first aspect, the inflator may be disposed toward a seat front side in the cushion airbag. The cushion airbag may be formed by sewing a base cloth folded at the center such that portions of the base cloth overlap each other in an up-down direction. A folded portion of the base cloth may be disposed along the seat width direction to form a seat rear side end portion of the cushion airbag. A stitched portion of the cushion airbag may include a pair of side stitched portions that is provided on opposite sides in the seat width direction and extends in the seat front-rear direction, and a pair of rear stitched portions that extends toward an inner oblique rear side in the seat width direction from respective rear ends of the side stitched portions to a seat width direction center portion of the folded portion and has rear ends distant from each other.

According to the first aspect, in the stitched portion of the cushion airbag, the rear stitched portions extend toward the inner oblique rear side in the seat width direction from the respective rear ends of the side stitched portions to the seat width direction center portion of the folded portion of the base cloth and have the rear ends distant from each other. Therefore, the length of the stitched portion which causes gas leakage can be suppressed. Accordingly, a decrease in the internal pressure of the expanded cushion airbag along with the elapse of time can be suppressed as compared to a structure in which upper and lower base cloths are connected to each other by sewing instead of the folded portion.

The inflator is disposed toward the seat front side in the cushion airbag, and the gas produced from the inflator is supplied to the seat rear side in the cushion airbag. Here, the folded portion of the base cloth is disposed along the seat width direction to form the seat rear side end portion of the cushion airbag. Therefore, in an initial stage of the expansion of the cushion airbag, gas leakage from the seat rear side end portion of the cushion airbag can be effectively suppressed.

A second aspect of the disclosure relates to a cushion airbag in which an inflator is accommodated in a seat front side in a state where the cushion airbag is mounted on a vehicular seat, and a push-up force in rear right and left regions corresponding to right and left hip joints to right and left lower ischium portions of a seat occupant of the vehicular seat in an expansion end state of the cushion airbag is set to be lower than a push-up force in a rear center region present between the rear right and left regions in the expansion end state. The cushion airbag is formed by sewing a base cloth folded at the center such that portions of the base cloth overlap each other in an up-down direction. A portion where the inflator is disposed is provided at a portion opposite to a folded portion side of the base cloth in the cushion airbag. A stitched portion of the cushion airbag includes a pair of side stitched portions that is provided on opposite sides in a first direction along an extending direction of the folded portion and extends along a second direction perpendicular to the first direction, and a pair of rear stitched portions that extends obliquely from respective folded portion side end portions of the side stitched portions to a center portion of the folded portion in the first direction to move close to each other and has end portions positioned in the folded portion and distant from each other.

According to the second aspect, in a case where the cushion airbag is mounted on a vehicular seat, the same operation and effects as that of the first aspect can be obtained. By suppressing the length of the stitched portion, the manufacturing costs of the cushion airbag can be suppressed.

A third aspect of the disclosure relates to a vehicular seat including a cushion panel, an inflator, and a cushion airbag. The cushion panel is disposed to extend in a seat front-rear direction and to form a portion of a seat cushion. The inflator is configured to operate to produce gas and is connected to an inside of the seat cushion. The cushion airbag is configured to expand due to the gas supplied from the inflator and to push up a range of the cushion panel including portions of a seat occupant from thighs to hip points at least in an expansion end state and is provided over the cushion panel. The cushion airbag is set such that a first force at which the cushion airbag pushes up the cushion panel in rear right and left regions corresponding to right and left hip joints to right and left lower ischium portions of the seat occupant in the expansion end state is lower than a second force at which the cushion airbag pushes up the cushion panel in a rear center region present between the rear right and left regions in the expansion end state.

A fourth aspect of the disclosure relates to a cushion airbag in which an inflator is accommodated in a seat front side in a state where the cushion airbag is mounted on a vehicular seat, and a first force at which the cushion airbag pushes up rear right and left regions corresponding to right and left hip joints to right and left lower ischium portions of a seat occupant of the vehicular seat in an expansion end state of the cushion airbag is set to be lower than a second force at which the cushion airbag pushes up a rear center region present between the rear right and left regions in the expansion end state. The cushion airbag includes a base cloth, a stitched portion, and a portion where the inflator is disposed. The base cloth is folded at the center such that portions of the base cloth overlap each other in an up-down direction. The stitched portion is obtained by sewing the base cloth. The portion where the inflator is disposed is provided opposite to a folded portion side of the base cloth. The stitched portion includes a pair of side stitched portions that is provided on opposite sides in a first direction along an extending direction of the folded portion and extends along a second direction perpendicular to the first direction, and a pair of rear stitched portions that extends obliquely from respective folded portion side end portions of the side stitched portions to a center portion of the folded portion in the first direction to move close to each other and has end portions positioned in the folded portion and distant from each other.

As described above, according to the first aspect, an excellent effect is obtained in that a load on the neck of the seat occupant can be reduced while maintaining the restraining force applied to the waist during a frontal collision.

According to the first aspect, by forming the upper surface of the cushion airbag to be stepwise during the expansion, an excellent effect is obtained in that a load on the neck of the seat occupant can be reduced while maintaining the restraining force applied to the waist during a frontal collision.

According to the first aspect, an excellent effect is obtained in that, in a case where the cushion airbag expands in the occupant seated state, the position of the upper surface of the cushion airbag can be easily set.

According to the first aspect, an excellent effect is obtained in that, in a case where the cushion airbag expands in the occupant seated state, the position of the upper surface of the cushion airbag can be easily set without devising peripheral structures of the cushion airbag.

According to the first aspect, the shape of the cushion panel can be adjusted such that the expansion of the cushion airbag toward the seat lower side of the rear side portion is allowed. As a result, an excellent effect is obtained in that the position of the upper surface of the cushion airbag expanded in the occupant seated state can be easily set.

According to the first aspect, during the expansion of the cushion airbag in the occupant seated state, the cushion panel is deformed so as to allow the expansion of the rear side portions of the cushion airbag toward the seat lower side. As a result, an excellent effect is obtained in that the position of the upper surface of the cushion airbag expanded in the occupant seated state can be easily set.

According to the first aspect, an excellent effect is obtained in that gas leakage from the seat rear side end portion of the cushion airbag can be effectively suppressed during and after the expansion of the cushion airbag.

According to the second to fourth aspects, an excellent effect is obtained in that, in a case where the cushion airbag is mounted on a vehicular seat, the same effects as that of the first aspect can be obtained.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Hereinafter, a vehicular seat 10 equipped with a cushion airbag device according to a first embodiment of the disclosure (hereinafter, abbreviated as "vehicular seat 10") will be described based on FIGS. 1 to 4. In FIGS. 1 to 4, appropriately, arrow FR indicates a vehicle front side, arrow UP indicates a vehicle upper side, and arrow W indicates a vehicle width direction. Hereinafter, unless specified otherwise, a front-rear direction, a right-left direction, and an up-down direction used for the description represent a vehicle front-rear direction, a vehicle right-left direction (vehicle width direction), and a vehicle up-down direction, respectively.

Figure 1:
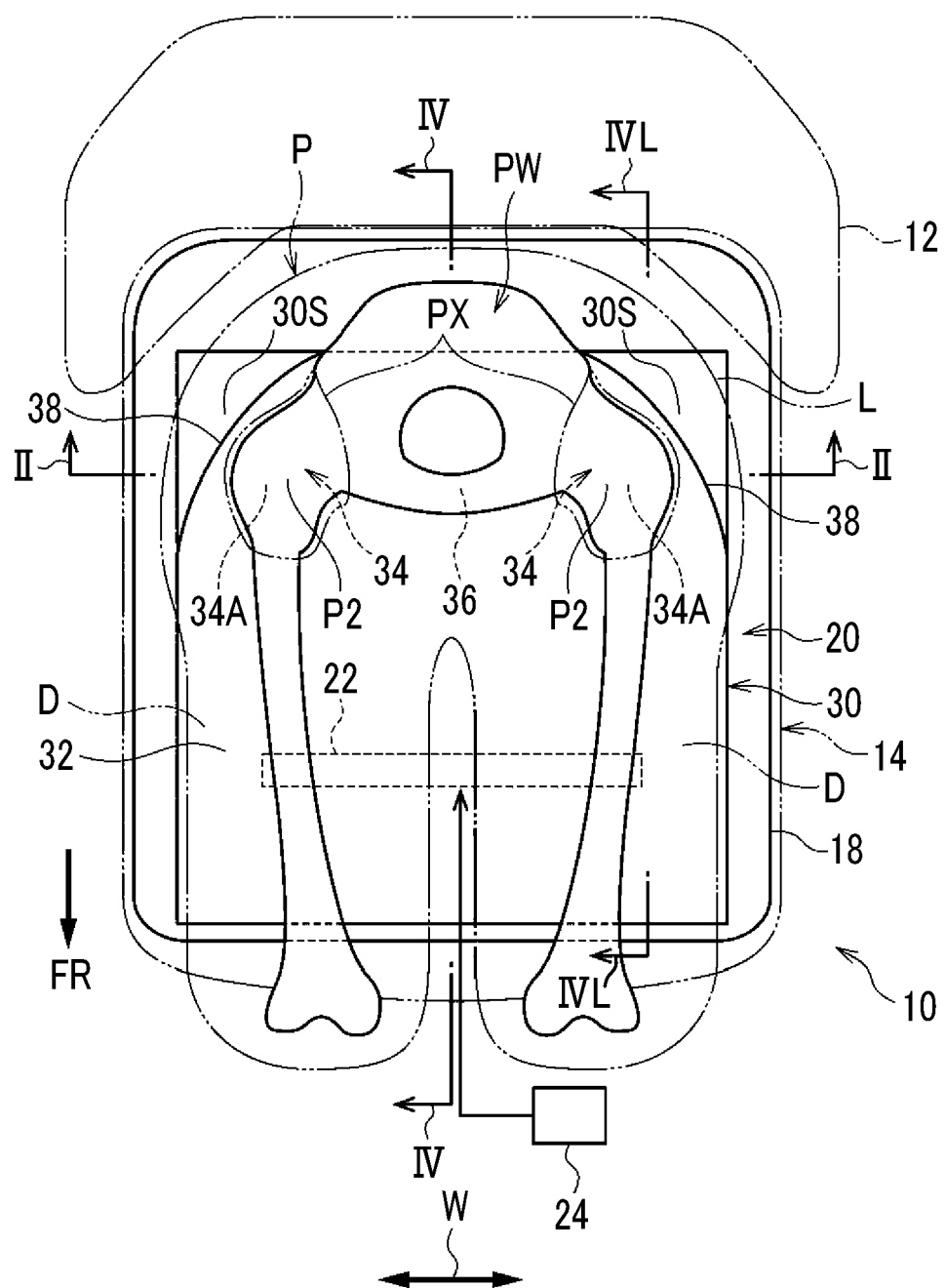
FIG. 1 is a plan view showing major components of a vehicular seat equipped with a cushion airbag device according to a first embodiment of the disclosure.

As shown in FIG. 1, the vehicular seat 10 according to the embodiment is used as a front seat in a vehicle such as a passenger vehicle. In the vehicular seat 10 according to the embodiment, a seat front-rear direction matches a vehicle front-rear direction, and a seat width direction matches a vehicle width direction. The vehicular seat 10 includes: a seat cushion 14 for supporting a waist L (here, including the hip) and thighs D of a seat occupant P; and a seat back 12 for supporting a back B (refer to FIG. 4) of the seat occupant P.

Figure 2:
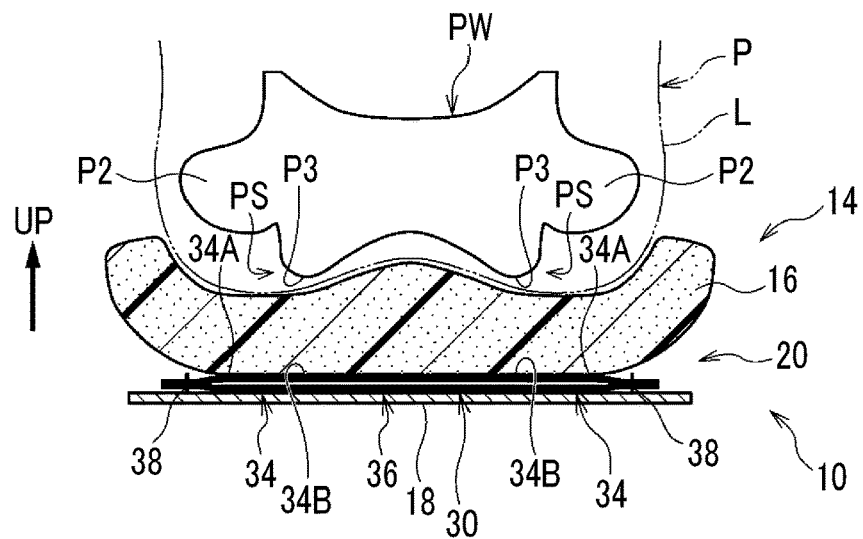
FIG. 2 is a schematic longitudinal sectional view cut along line II-II of FIG. 1.
Figure 3:
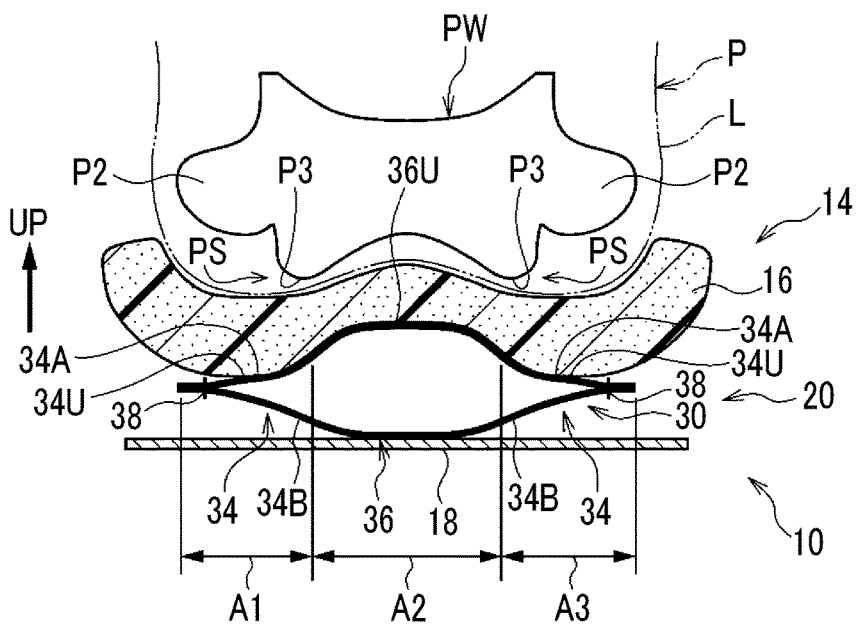
FIG. 3 is a longitudinal sectional view cut at the same cutting position as that of FIG. 2 showing a state where the cushion airbag of FIG. 1 expands.

In FIGS. 1 to 3, a part of a skeleton including a hip bone PW of the seat occupant P is schematically shown in a perspective view of the seat occupant P. The seat occupant P shown in FIGS. 1 to 4 is in the same state as a state where, for example, an American male 50 percentile (AM50) crash test dummy is seated in a standard sitting posture determined using a collision test method. The vehicular seat 10 is positioned at a reference setting position corresponding to the sitting posture.

As shown in FIG. 2, the seat cushion 14 is configured to include: a cushion pad (also referred to as "seat form pad") 16; and a cushion panel 18 that is positioned on a seat lower side of the cushion pad 16 and supports the cushion pad 16. A surface of the cushion pad 16 is covered with a skin (not shown). The cushion panel 18 functions as a seat frame member constituting a bottom portion of the seat cushion 14 and extends in the seat front-rear direction and the seat width direction. The seat cushion 14 shown in FIG. 1 is equipped with a cushion airbag device 20. The cushion airbag device 20 includes an inflator 22 and a cushion airbag 30.

The inflator 22 is provided close to a front portion of a seat front-rear direction center portion in the seat cushion 14 and is disposed such that a longitudinal direction matches the seat width direction. The inflator 22 is, for example, a cylindrical gas producing device that is configured to inject gas during a frontal collision of the vehicle or during estimation of a frontal collision such that the gas can be supplied into the cushion airbag 30. The inflator 22 is connected to an airbag electronic control unit (ECU) 24 through a wiring harness (not shown), and is configured to operate based on an operation current output from the airbag ECU 24 to produce gas. In a case where the airbag ECU 24 determines or estimates a frontal collision of the vehicle based on a signal output from a collision sensor (not shown), the airbag ECU 24 is configured to cause an operation current to flow through the inflator 22.

Figure 4:
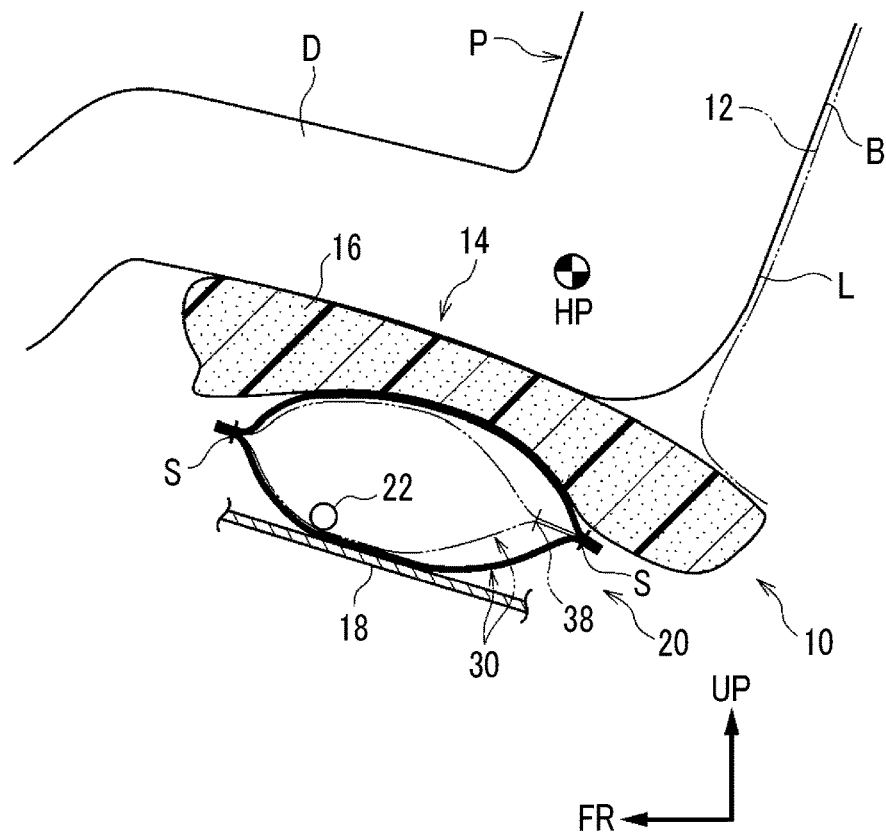
FIG. 4 is a schematic longitudinal sectional view cut along line IV-IV of FIG. 1 showing a state where the cushion airbag of FIG. 1 expands, in which the cushion airbag indicated by a two-dot chain line is shown cut along line IVL-IVL of FIG. 1.

As shown in FIG. 2, the cushion airbag 30 is provided over the cushion panel 18 and is disposed under the cushion pad 16. The cushion airbag 30 is formed by cutting a nylon or polyester base cloth to form one panel or a plurality of panels and sewing the panel or the panels in a bag shape. The inflator 22 shown in FIG. 4 is accommodated in the cushion airbag 30. A stud bolt is vertically provided on a peripheral wall portion of the inflator 22, and this stud bolt penetrates the cushion airbag 30 and the cushion panel 18. A nut (not shown) is screwed from the outside of the cushion panel 18 into a penetrating end portion of the stud bolt such that the cushion airbag 30 is fixed to the cushion panel 18 together with the inflator 22.

A stitched portion on a peripheral edge portion side of the cushion airbag 30 is not shown in FIG. 1 and is represented by the symbol S in FIG. 4. In FIGS. 2 to 4, a section of the cushion airbag 30 is indicated by a thick line without showing the thickness thereof for convenience. Further, in FIG. 2, in order to make the components easily recognizable, a gap is formed between right-left direction center portions of upper and lower cloth portions of the cushion airbag 30 (the same shall be applied to FIG. 5 in a second embodiment described below and to FIG. 8 in a third embodiment described below).

The cushion airbag 30 is configured to expand as shown in FIGS. 3 and 4 due to the gas supplied from the inflator 22 (refer to FIG. 1). As shown in FIG. 4, the cushion airbag 30 pushes up a range including portions of the seat occupant P from thighs D to hip points HP (designed hip points) in an expansion end state. In the expansion end state, a rear end portion of the cushion airbag 30 is set further toward a seat rear side than the hip points HP of the seat occupant P In FIG. 4, the cushion airbag 30 indicated by a solid line is shown cut along line IV-IV of FIG. 1, and the cushion airbag 30 indicated by a two-dot chain line is shown cut along line IVL-IVL of FIG. 1.

As shown in FIG. 1, the cushion airbag 30 includes: a front portion 32 that includes portions corresponding to the thighs D of the seat occupant P; a pair of right and left rear side portions 34 that is provided in the rear of the front portion 32; and a rear center portion 36 that is disposed between the right and left rear side portions 34. As shown in FIG. 2, the right and left rear side portions 34 are set in a range from hip joint corresponding portions 34A that are portions corresponding to hip joints P2 of the seat occupant P to lower ischium edge corresponding portions 34B that are portions corresponding to lower ischium edges P3 of the seat occupant P. In FIG. 1, in a plan view of the vehicle, the range (the vicinity of the range) from the hip joints P2 of the seat occupant P to the lower ischium edges P3 (refer to FIG. 2) of the seat occupant P is surrounded by a two-dot chain line PX.

As shown in FIG. 1, sewn portions 38 (schematically indicated by a sewing line in the drawing) are provided in right and left side portions 30S of a rear portion of the cushion airbag 30, the sewn portions 38 connecting overlapping portions of the right and left side portions 30S in the seat up-down direction to each other to restrict an expansion thickness of the rear side portions 34 in the seat up-down direction during the expansion of the cushion airbag 30. As described above, as shown in FIG. 3, an expansion thickness of the rear side portions 34 in a seat up-down direction during the expansion of the cushion airbag 30 is set to be less than an expansion thickness of the rear center portion 36 in the seat up-down direction during the expansion of the cushion airbag 30. The cushion airbag 30 is set such that a push-up force in rear right and left regions A1, A3 corresponding to the right and left hip joints P2 to right and left lower ischium portions PS of the seat occupant P in the expansion end state is lower than a push-up force in a rear center region A2 present between the rear right and left regions A1, A3 in the expansion end state. The cushion airbag 30 is set such that, during the expansion of the cushion airbag 30 in an occupant seated state, upper surfaces 34U of the hip joint corresponding portions 34A of the rear side portions 34 have a step difference from and are lower than an upper surface 36U of a seat width direction center portion of the rear center portion 36.

Operation and Effects

The operation and effects of the embodiment will be described.

In a case where a frontal collision of the vehicle is detected or estimated, the inflator 22 shown in FIG. 1 operates to produce gas, and the cushion airbag 30 expands due to the gas supplied from the inflator 22. The cushion airbag 30 includes the front portion 32 that includes portions corresponding to the thighs D of the seat occupant P. Therefore, the thighs D of the seat occupant P can be pushed up and restrained from moving by the expanded front portion 32.

Here, the cushion airbag 30 shown in FIG. 3 is set such that the push-up force in the rear right and left regions A1, A3 corresponding to the right and left hip joints P2 to the right and left lower ischium portions PS of the seat occupant P in the expansion end state is lower than the push-up force in the rear center region A2 present between the rear right and left regions A1, A3 in the expansion end state. Accordingly, the push-up force of the cushion airbag 30 is applied to a recess portion between the lower ischium portions PS of the seat occupant P, whereas the range of the seat occupant P from the hip joints P2 to the lower ischium portions PS is not strongly pushed up. Therefore, the waist L of the seat occupant P is restrained from moving while suppressing the upward movement of the seat occupant P.

In the expansion end state, as shown in FIG. 4, the rear end portion of the cushion airbag 30 is set further toward the seat rear side than the hip points HP of the seat occupant P. In addition, as shown in FIG. 2, the cushion airbag 30 includes: the right and left rear side portions 34 that are set in the range from the hip joint corresponding portion 34A to the lower ischium edge corresponding portions 34B; and the rear center portion 36 that is disposed between the right and left rear side portions 34. Here, as shown in FIG. 3, the cushion airbag 30 is set such that, during the expansion of the cushion airbag 30 in the occupant seated state, the upper surfaces 34U of the hip joint corresponding portions 34A of the rear side portions 34 have a step difference from and are lower than the upper surface 36U of the seat width direction center portion of the rear center portion 36. Accordingly, the seat width direction center portion in the rear center portion 36 of the cushion airbag 30 is mainly pushed toward the recess portion between the lower ischium edges P3 in the hip bone PW of the seat occupant P, whereas the range of the seat occupant P from the hip joints P2 to the lower ischium edges P3 is not strongly pushed up. Therefore, the waist L of the seat occupant P is restrained from moving while suppressing the upward movement of the seat occupant P.

As described above, with the vehicular seat 10 according to the embodiment, a load on the neck of the seat occupant P can be reduced while maintaining the restraining force applied to the waist L during a frontal collision.

In the embodiment, during the expansion of the cushion airbag 30, the expansion thickness of the rear side portions 34 in the seat up-down direction is set to be less than the expansion thickness of the rear center portion 36 in the seat up-down direction. Therefore, the cushion airbag 30 can be relatively easily set such that, during the expansion of the cushion airbag 30 in the occupant seated state, the upper surfaces 34U of the hip joint corresponding portions 34A of the rear side portions 34 have a step difference from and are lower than the upper surface 36U of the seat width direction center portion of the rear center portion 36.

In the embodiment, the sewn portions 38 that are provided in the right and left side portions 30S of the rear portion of the cushion airbag 30 shown in FIG. 1 connect overlapping portions of the right and left side portions 30S in the seat up-down direction to each other to restrict the expansion thickness of the rear side portions 34 in the seat up-down direction during the expansion of the cushion airbag 30. Therefore, the cushion airbag 30 can be relatively easily set with a simple configuration without devising peripheral structures of the cushion panel 18 and the like such that, during the expansion of the cushion airbag 30 in the occupant seated state shown in FIG. 3, the upper surfaces 34U of the hip joint corresponding portions 34A of the rear side portions 34 have a step difference from and are lower than the upper surface 36U of the seat width direction center portion of the rear center portion 36.

A modification example of the first embodiment may be adopted in which tethers (not shown in the drawing; partitioning cloth that partitions the inside of the cushion airbag) are provided in the right and left side portions 30S of the rear portion of the cushion airbag 30 instead of the sewn portions 38 shown in FIG. 1 of the embodiment, the tethers connecting overlapping portions of the right and left side portions 30S in the seat up-down direction to each other to restrict the expansion thickness of the rear side portions 34 in the seat up-down direction during the expansion of the cushion airbag 30. With the configuration, substantially the same operation and effects of the first embodiment can be obtained.

A cushion airbag 60 that is applicable instead of the cushion airbag 30 according to the first embodiment will be described with reference to FIGS. 10A, 10B, and 11.

Figure 10B:
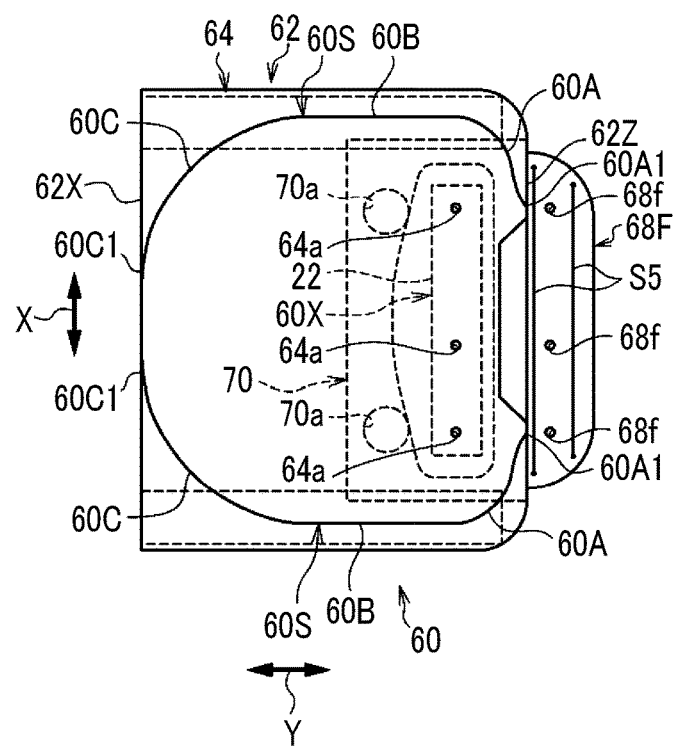
FIG. 10B is a plan view showing a cushion airbag that is applicable instead of the cushion airbag according to the first embodiment, in which the base cloth folded at the center is sewn.
Figure 11:
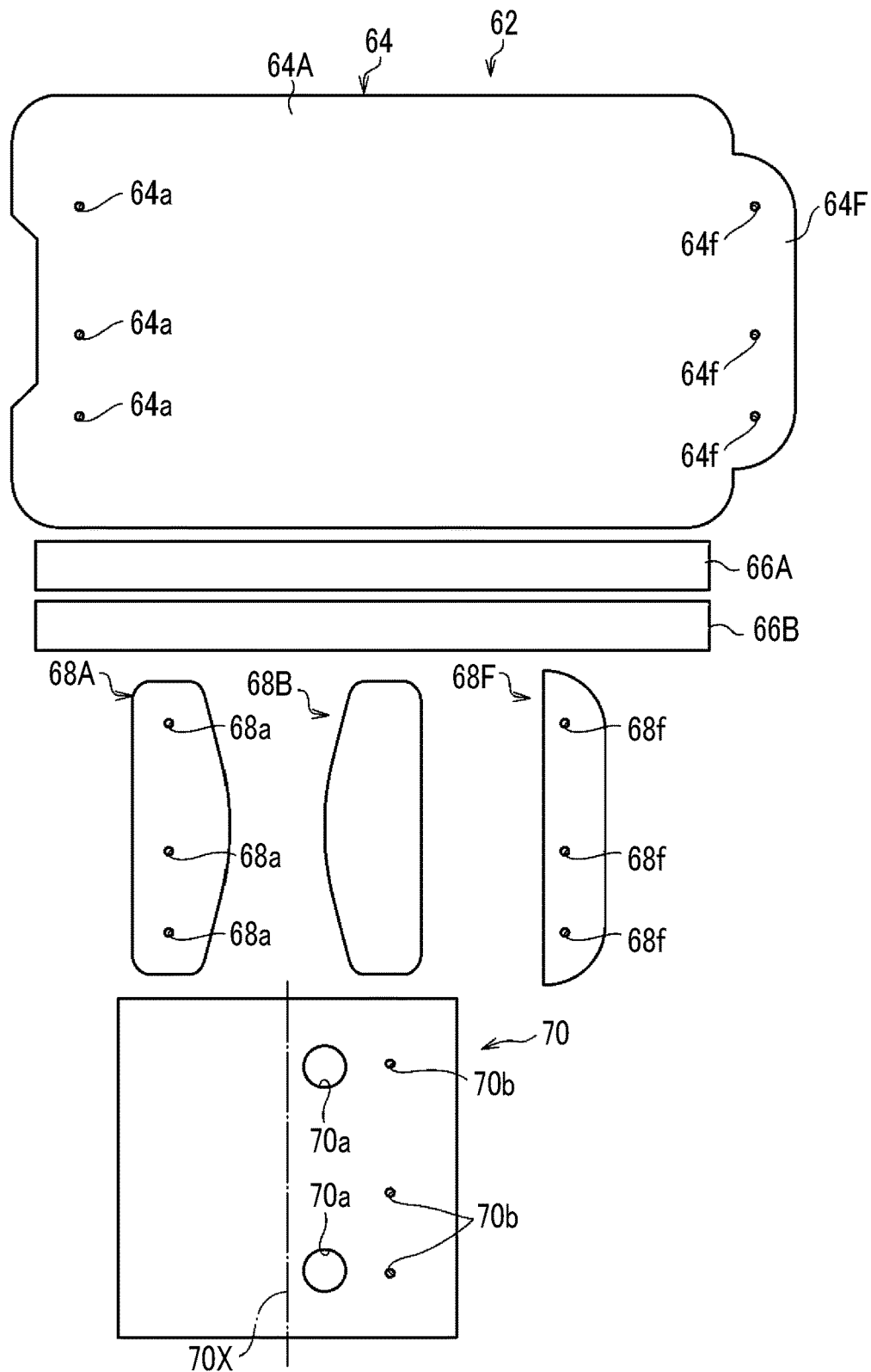
FIG. 11 is an exploded plan view showing a state where the base cloth shown in FIG. 10A is disassembled.

As shown in an exploded plan view of FIG. 11, a base cloth 62 of the cushion airbag 60 (refer to FIG. 10B) is configured of a base cloth main body 64, reinforcing base cloths 66A, 66B, 68A, 68B, 68F, and a regulating base cloth 70. The base cloth main body 64 includes: a substantially rectangular main body main portion 64A; and a flap portion 64F that projects toward one side of the main body main portion 64A in a longitudinal direction. In an opposite portion of the main body main portion 64A from the flap portion 64F side and the flap portion 64F, a plurality (in the embodiment, three) of attachment holes 64*a*, 64*f* for the attachment of the inflator disposed in a transverse direction of the base cloth main body 64 is formed, respectively.

In the reinforcing base cloths 68A, 68F among the reinforcing base cloths 68A, 68B, 68F that are provided corresponding to an installation position of the inflator 22 (refer to FIGS. 10A and 10B), a plurality (in the embodiment, three) of attachment holes 68*a*, 68*f* for the attachment of the inflator is formed, respectively. The reinforcing base cloths 66A, 66B for reinforcing opposite sides of the base cloth main body 64 in the transverse direction have an elongated belt shape. Further, the regulating base cloth 70 has a substantially square shape and is folded along a folding line 70X set at the center such that portions of the regulating base cloth 70 overlap each other in the up-down direction. The inflator 22 (refer to FIGS. 10A and 10B) is disposed between the portions of the folded regulating base cloth 70. In the vicinity of the folding line 70X of the regulating base cloth 70, regulating holes 70*a* are formed on opposite sides in a direction along the folding line 70X. The regulating holes 70*a* are provided to regulate the gas of the inflator 22 (refer to FIGS. 10A and 10B) and supply the regulated gas. In the regulating base cloth 70, attachment holes 70*b* for the attachment of the inflator are formed on opposite sides of the regulating holes 70*a* from the folding line 70X. A plurality (in the embodiment, three) of attachment holes 70*b* is disposed in a direction along the folding line 70X.

Figure 10A:
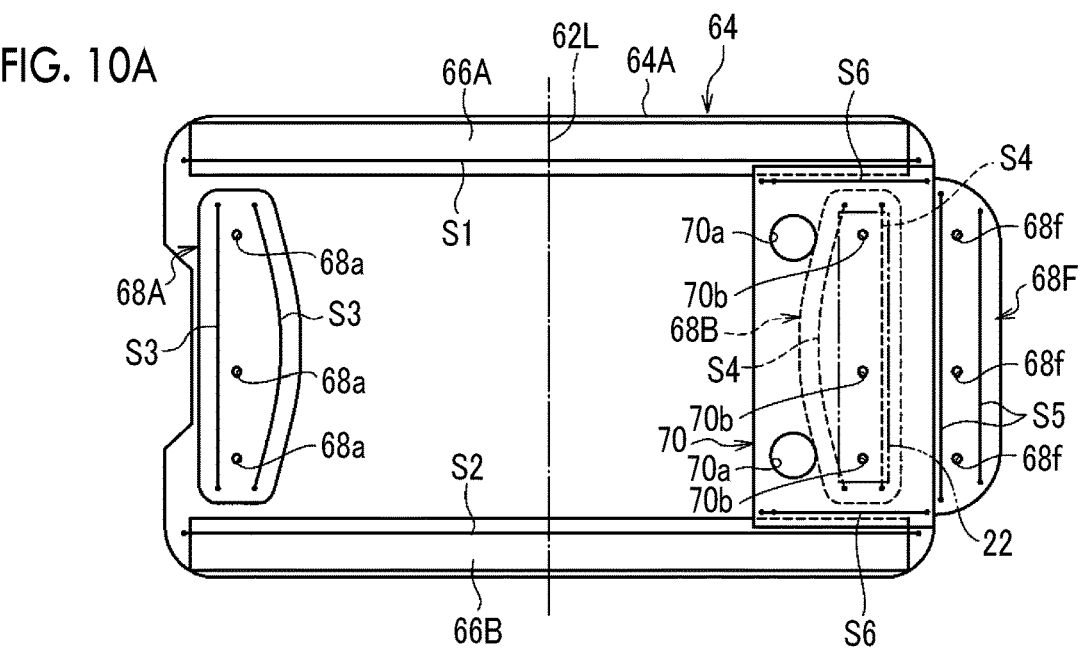
FIG. 10A is a plan view showing a cushion airbag that is applicable instead of the cushion airbag according to the first embodiment, in which a base cloth is not yet folded at the center.

As shown in FIG. 10A, on opposite sides of the base cloth main body 64 in the transverse direction, the reinforcing base cloths 66A, 66B are sewn along sewing lines 51, S2. The reinforcing base cloths 66A, 66B are disposed such that a longitudinal direction thereof matches a longitudinal direction of the base cloth main body 64. The reinforcing base cloths 68A, 68B are disposed on opposite sides of the main body main portion 64A in the longitudinal direction, and the reinforcing base cloth 68F is disposed to overlap the flap portion 64F (refer to FIG. 11). The reinforcing base cloths 68A, 68F are disposed over the base cloth main body 64 such that the attachment holes 68*a*, 68*f* match the attachment holes 64*a*, 64*f* of the base cloth main body 64 shown in FIG. 11. The reinforcing base cloths 68A, 68B, 68F shown in FIG. 10A are sewn to the base cloth main body 64 along sewing lines S3, S4, S5.

On the flap portion 64F (refer to FIG. 11) side (right side in the drawing) of the main body main portion 64A of the base cloth main body 64, the regulating base cloth 70 is sewn along a sewing line S6. The regulating base cloth 70 is disposed such that the reinforcing base cloth 66B is interposed between the portions of the base cloth main body 64 and a longitudinal direction of the regulating base cloth 70 matches the transverse direction of the base cloth main body 64. The regulating base cloth 70 is disposed such that the regulating holes 70*a* are opposite (the left side in the drawing) to the flap portion 64F (refer to FIG. 11) side.

As shown in FIG. 10B, the cushion airbag 60 is formed by sewing the base cloth 62 folded at the center such that portions of the base cloth 62 overlap each other in the up-down direction and the regulating base cloth 70 and the like face inward. A chain line 62L in FIG. 10A indicates a folding estimation position of the base cloth 62. As shown in FIG. 10B, the cushion airbag 60 has a configuration in which a portion 60X where the inflator 22 is disposed is provided at a portion opposite to a folded portion 62X side in the cushion airbag 60. In a state (hereinafter, abbreviated as "seat mounted state") where the cushion airbag 60 is mounted on the vehicular seat 10 (refer to FIG. 1), the portion 60X where the inflator 22 is disposed is a seat front side portion in the cushion airbag 60. In the cushion airbag 60, in the seat mounted state, the folded portion 62X of the base cloth 62 is disposed along the seat width direction to form a seat rear side end portion.

A stitched portion 60S of the cushion airbag 60 includes a pair of side stitched portions 60B that is provided on opposite sides in a first direction X along an extending direction of the folded portion 62X (opposite sides in the seat width direction in the seat mounted state) and extends along a second direction Y (the seat front-rear direction in the seat mounted state) perpendicular to the first direction X. The stitched portion 60S of the cushion airbag 60 includes: a pair of front stitched portions 60A that continuously extends along one end side (right side in the drawing) of the side stitched portions 60B; and a pair of rear stitched portions 60C that continuously extends along the other end side (left side in the drawing) of the side stitched portions 60B.

The front stitched portions 60A extend obliquely (toward an inner oblique front side in the seat width direction in the seat mounted state) from respective opposite end portions (respective front ends in the seat mounted state) of the side stitched portions 60B from the folded portion 62X to move close to each other. End portions (front ends in the seat mounted state) 60A1 of the front stitched portions 60A that are positioned in a terminal 62Z of the base cloth 62 opposite to the folded portion side are distant from each other and are disposed at positions adjacent to the reinforcing base cloth 68F.

The rear stitched portions 60C extends obliquely (extends toward an inner oblique rear side in the seat width direction in the seat mounted state) from respective folded portion 62X side end portions (respective rear ends in the seat mounted state) of the side stitched portions 60B to a center portion (seat width direction center portion in the seat mounted state) of the folded portion 62X in the first direction X to move close to each other. The rear stitched portions 60C have an arc shape that protrudes toward the outside of the base cloth 62 in a plan view (toward an outer oblique rear side in the seat width direction in the seat mounted state). End portions (rear ends in the seat mounted state) 60C1 of the rear stitched portions 60C that are positioned in the folded portion 62X are distant from each other. The rear stitched portions 60C are components having the same function as that of the sewn portions 38 (refer to FIG. 1) in the first embodiment.

The flap portion 64F (refer to FIG. 11) to which the reinforcing base cloth 68F is sewn is folded (not shown) such that the positions of the attachment holes 68*f* match the positions of the attachment holes 64*a* of the base cloth main body 64 shown in FIG. 10B. A stud bolt (not shown) that is vertically provided on the peripheral wall of the inflator 22 penetrates the attachment holes 70*b*, 68*a* shown in FIG. 10A, the attachment holes 64*a*, 68*f* shown in FIG. 10B, and the cushion panel 18 (refer to FIGS. 1 to 4), and is fastened with a nut (not shown). As a result, the cushion airbag 60 is fixed to the cushion panel 18 (refer to FIGS. 1 to 4) in a state where the inflator 22 is accommodated therein. As in the cushion airbag 30 (refer to FIGS. 1 to 4) according to the first embodiment, the cushion airbag 60 is set such that the push-up force in the rear right and left regions A1, A3 corresponding to the right and left hip joints P2 to the right and left lower ischium portions PS of the seat occupant P of the vehicular seat 10 shown in FIG. 3 in the expansion end state of the cushion airbag is lower than the push-up force in the rear center region A2 present between the rear right and left regions A1, A3 in the expansion end state.

In a case where the cushion airbag 60 shown in FIG. 10B is disposed instead of the cushion airbag 30 (refer to FIGS. 1 to 4) of the first embodiment, the same operation and effects as those of the first embodiment can be obtained, and the length of the stitched portion which causes gas leakage can be suppressed. Accordingly, a decrease in the internal pressure of the expanded cushion airbag 60 along with the elapse of time can be suppressed. By suppressing the length of the stitched portion, the manufacturing costs of the cushion airbag 60 can be suppressed. The folded portion 62X of the base cloth 62 is disposed along the seat width direction to form a seat rear side end portion of the cushion airbag 60. Therefore, in an initial stage of the expansion of the cushion airbag 60, gas leakage from the seat rear side end portion of the cushion airbag 60 can be effectively suppressed.

Second Embodiment

Figure 5:
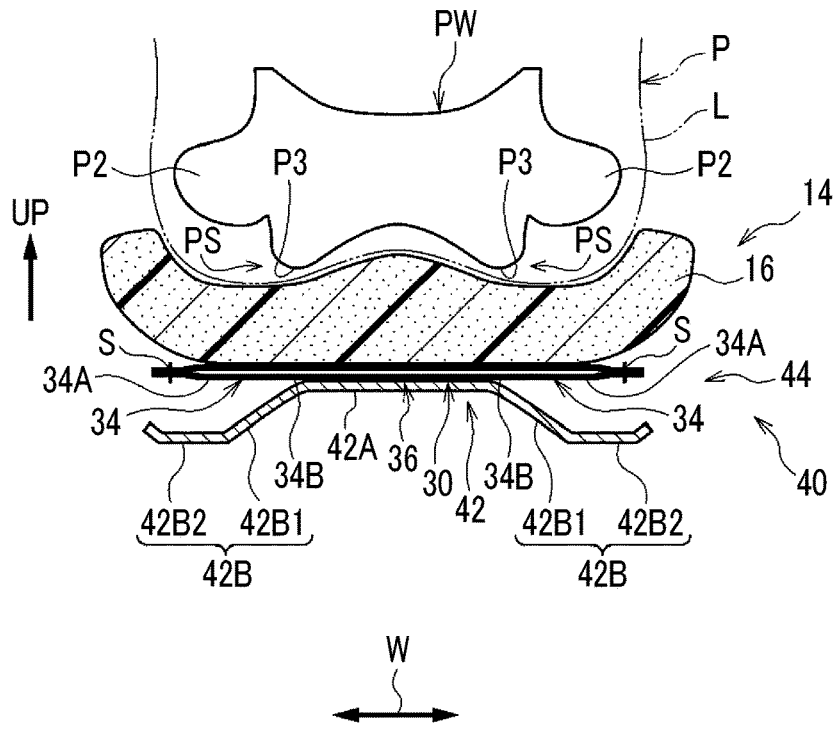
FIG. 5 is a longitudinal sectional view corresponding to FIG. 2 showing major components of a vehicular seat equipped with a cushion airbag device according to a second embodiment of the disclosure in a front view.
Figure 6:
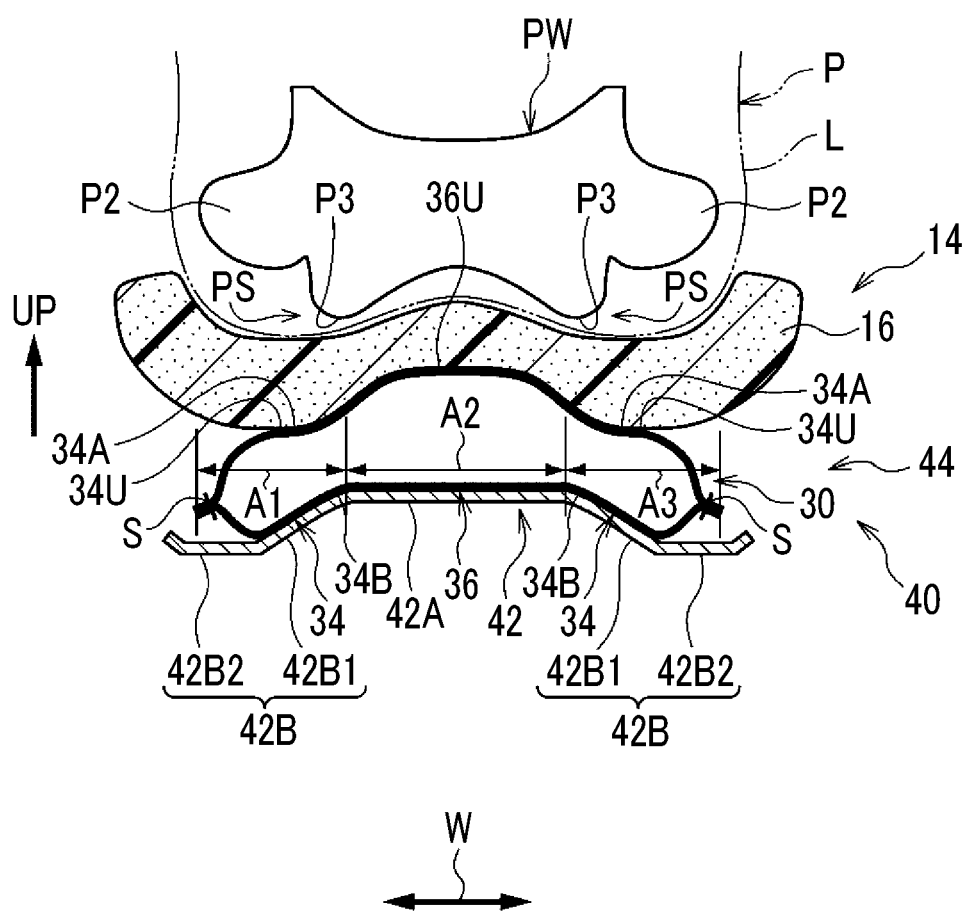
FIG. 6 is a longitudinal sectional view cut at the same cutting position as that of FIG. 5 showing a state where the cushion airbag of FIG. 5 expands.

A vehicular seat 40 equipped with a cushion airbag device 44 according to a second embodiment of the disclosure will be described using FIGS. 5 and 6. As shown in FIGS. 5 and 6, the second embodiment is different from the first embodiment in that a cushion panel 42 is provided instead of the cushion panel 18 (refer to FIGS. 1 to 4) and that the curved sewn portions 38 (refer to FIG. 1) are not provided. The other configurations are substantially the same as those of the first embodiment.

The cushion airbag 30 does not include the sewn portions 38 (refer to FIG. 1), but the other configurations are the same as those of the cushion airbag 30 according to the first embodiment. Therefore, for convenience of description, the components are represented by the same reference numerals as those of the first embodiment. In addition, substantially the same components as those of the first embodiment are represented by the same reference numerals, and the description thereof will not be repeated.

As in the cushion panel 18 (refer to FIG. 1) according to the first embodiment, the cushion panel 42 shown in FIG. 5 extends in the seat front-rear direction and functions as a seat frame member constituting the bottom portion of the seat cushion 14. The cushion panel 42 includes: a panel rear center portion 42A that is a portion corresponding to the rear center portion 36 of the cushion airbag 30; and panel rear side portions 42B that are disposed outside of the panel rear center portion 42A in the seat width direction. The panel rear side portions 42B are positioned further toward a seat lower side than at least the seat width direction center portion of the panel rear center portion 42A. In addition, each of the panel rear side portions 42B includes: an inclined portion 42B1 that is inclined toward the seat lower side from an outer end portion of the panel rear center portion 42A in the seat width direction to the outside of the panel rear center portion 42A in the seat width direction; and a side lower wall portion 42B2 that extends from an outer end portion of the inclined portion 42B1 in the seat width direction to the outside of the inclined portion 42B1 in the seat width direction. As described above, as shown in FIG. 6, the cushion airbag 30 is set such that, during the expansion of the cushion airbag 30 in the occupant seated state, the upper surfaces 34U of the hip joint corresponding portions 34A of the rear side portions 34 have a step difference from and are lower than the upper surface 36U of the seat width direction center portion of the rear center portion 36. The setting for the respective push-up forces of the rear right and left regions A1, A3 and the rear center region A2 during the expansion of the cushion airbag 30 according to the embodiment is the same as the setting for the respective push-up forces of the rear right and left regions A1, A3 and the rear center region A2 during the expansion of the cushion airbag 30 (refer to FIG. 3) according to the first embodiment.

Although not shown in the drawing, a disposition region of the cushion panel 42 in a plan view of the vehicle is set to be substantially the same as a disposition region of the cushion panel 18 (refer to FIG. 1) according to the first embodiment in a plan view of the vehicle. In the cushion panel 42, the panel rear side portions 42B are positioned further toward the seat lower side than the other portions.

With the configuration of the embodiment, the setting for the respective push-up forces of the rear right and left regions A1, A3 and the rear center region A2 during the expansion of the cushion airbag 30 is the same as that of the first embodiment. Therefore, regarding the push-up during the expansion of the cushion airbag 30, the same operation and effects as those of the first embodiment can be obtained.

In the configuration of the embodiment, the expansion of the rear side portions 34 of the cushion airbag 30 is allowed further toward the seat lower side than a height position of a surface where the seat width direction center portion of the rear center portion 36 of the cushion airbag 30 is supported by the seat width direction center portion of the panel rear center portion 42A of the cushion panel 42. In a case where a frontal collision of the vehicle in the occupant seated state is detected or estimated such that the inflator 22 (refer to FIG. 1) operates, as shown in FIG. 6, the cushion airbag 30 expands such that the upper surfaces 34U of the hip joint corresponding portions 34A of the rear side portions 34 have a step difference from and are lower than the upper surface 36U of the seat width direction center portion of the rear center portion 36. Accordingly, as in the first embodiment, the seat width direction center portion in the rear center portion 36 of the cushion airbag 30 is mainly pushed toward the recess portion between the lower ischium edges P3 in the hip bone PW of the seat occupant P, whereas the range of the seat occupant P from the hip joints P2 to the lower ischium edges P3 is not strongly pushed up. Therefore, the same effects as those of the first embodiment can be obtained.

In the embodiment, the shape of the cushion panel 42 can be adjusted such that the expansion of the cushion airbag 30 toward the seat lower side of the rear side portion 34 is allowed. During the expansion of the cushion airbag 30, a height position of upper surfaces (including the upper surfaces 34U of the hip joint corresponding portions 34A) of the rear side portions 34 of the cushion airbag 30 can be easily adjusted to be lower than a height position of the upper surface 36U of the seat width direction center portion of the rear center portion 36 of the cushion airbag 30.

Third Embodiment

Figure 7:
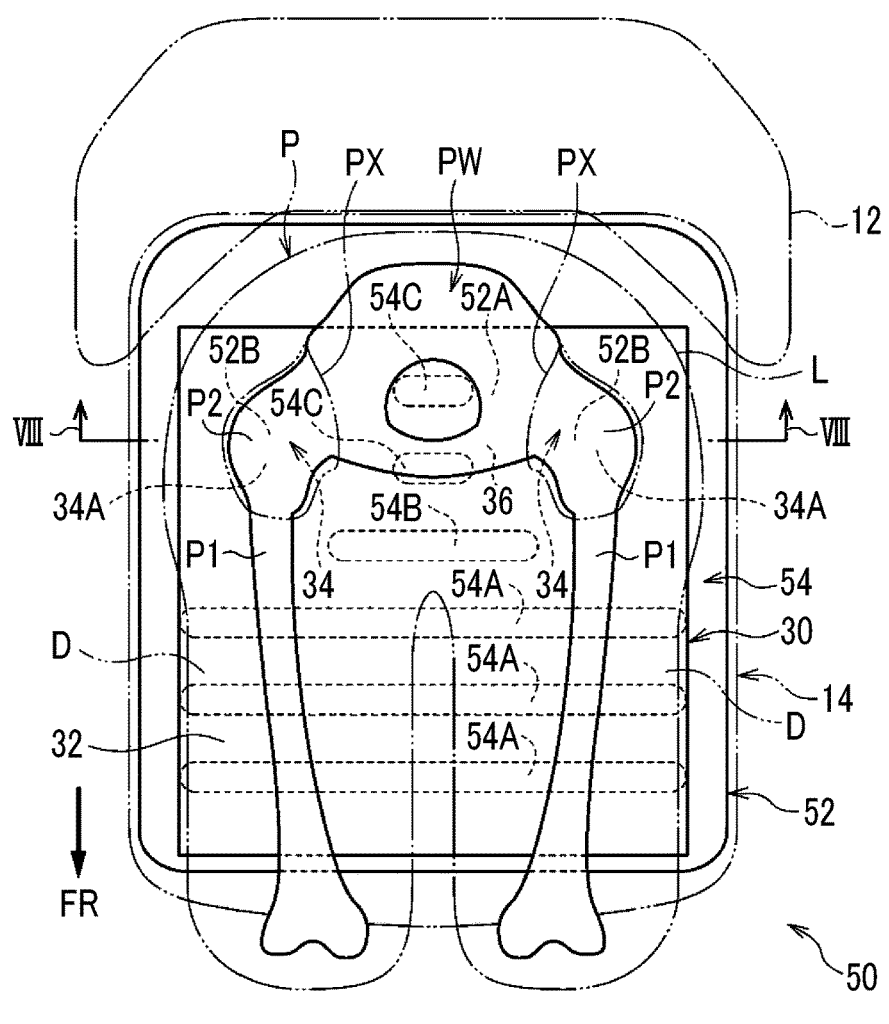
FIG. 7 is a plan view corresponding to FIG. 1 showing major components of a vehicular seat equipped with a cushion airbag device according to a third embodiment of the disclosure.
Figure 8:
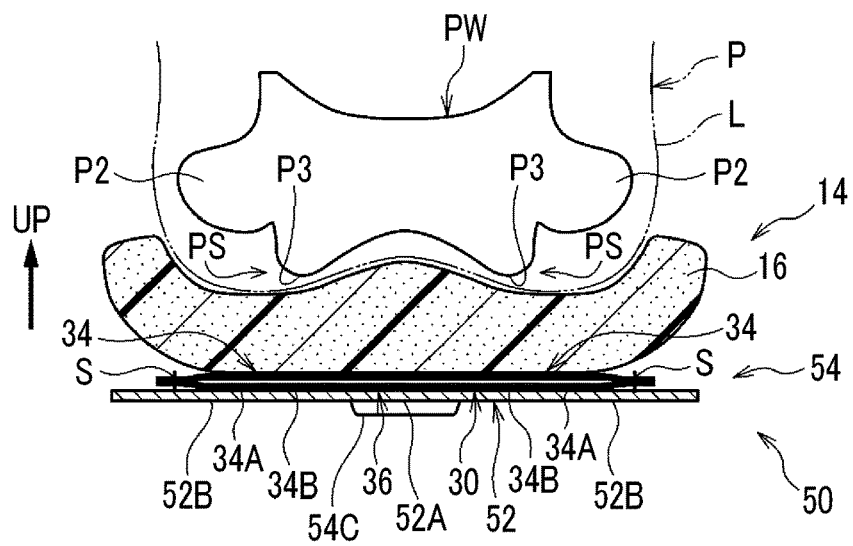
FIG. 8 is a schematic longitudinal sectional view cut along line VIII-VIII of FIG. 7.
Figure 9:
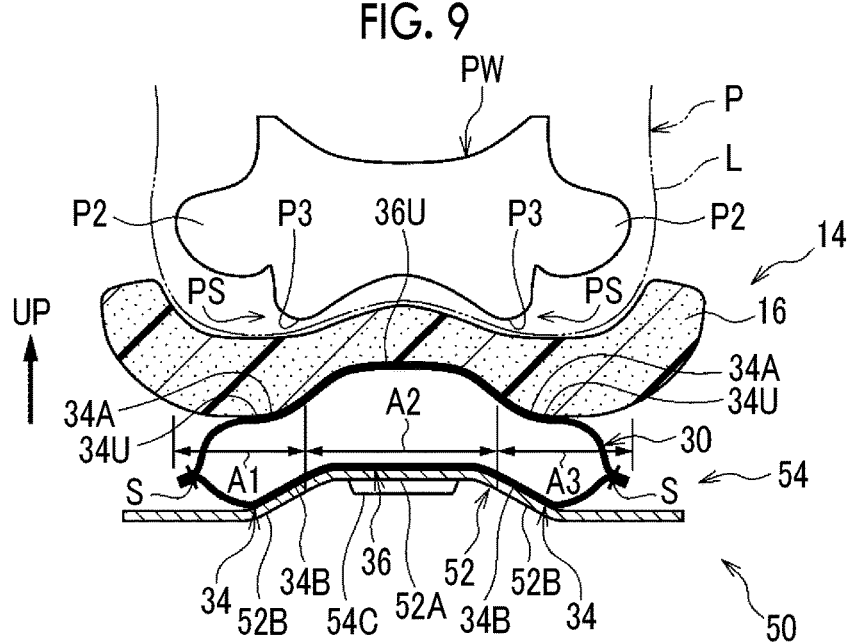
FIG. 9 is a longitudinal sectional view cut at the same cutting position as that of FIG. 8 showing a state where the cushion airbag of FIG. 7 expands.

A vehicular seat 50 equipped with a cushion airbag device 54 according to a third embodiment of the disclosure will be described using FIGS. 7 to 9. As shown in FIGS. 7 to 9, the third embodiment is different from the first embodiment in that a cushion panel 52 is provided instead of the cushion panel 18 (refer to FIGS. 1 to 4) and that the curved sewn portions 38 (refer to FIG. 1) are not provided. The other configurations are substantially the same as those of the first embodiment.

The cushion airbag 30 does not include the sewn portions 38 (refer to FIG. 1), but the other configurations are the same as those of the cushion airbag 30 according to the first embodiment. Therefore, for convenience of description, the components are represented by the same reference numerals as those of the first embodiment. In addition, substantially the same components as those of the first embodiment are represented by the same reference numerals, and the description thereof will not be repeated. In FIG. 7, in order to make the components easily recognizable, the inflator 22 (refer to FIG. 1) and the airbag ECU 24 (refer to FIG. 1) are not shown.

As in the cushion panel 18 (refer to FIG. 1) according to the first embodiment, the cushion panel 52 shown in FIG. 7 extends in the seat front-rear direction and functions as a seat frame member constituting the bottom portion of the seat cushion 14. In the cushion panel 52, reinforcing beads 54A, 54B, 54C that extend in the seat width direction and are recessed toward the seat lower side are formed. Right and left opposite ends of a plurality of beads 54A that is formed in a front portion of the cushion panel 52 are set at positions substantially corresponding to outer side surfaces of the thighs D of the seat occupant P. The beads 54B, 54C that are formed in a rear portion of the cushion panel 52 are set in seat width direction positions positioned further toward the inner side in the seat width direction than thigh bones P1 of the seat occupant P.

As shown in FIG. 8, the cushion panel 52 includes: a panel rear center portion 52A that is a portion corresponding to the rear center portion 36 of the cushion airbag 30; and panel rear side portions 52B that are disposed outside of the panel rear center portion 52A in the seat width direction. Among the beads 54B, 54C that are formed in the rear portion of the cushion panel 52 shown in FIG. 7, right and left opposite ends of a plurality of beads 54C that is formed in the panel rear center portion 52A do not extend over the panel rear side portions 52B. In other words, reinforcing beads are not formed in the panel rear side portions 52B. The stiffness of the panel rear side portions 52B in the seat up-down direction is set to be lower than that of the panel rear center portion 52A.

As described above, as shown in FIG. 9, the panel rear side portions 52B are set such that, in a case where the cushion airbag 30 expands in the occupant seated state, the panel rear side portions 52B receive an expansion pressure of the cushion airbag 30 to move down further toward the seat lower side than at least the seat width direction center portion of the panel rear center portion 52A. In addition, the cushion airbag 30 is pressed from the cushion pad 16 side due to the body weight and the like of the seat occupant P. Therefore, in a case where the cushion airbag 30 expands, the cushion airbag 30 obtains a reaction force from the cushion pad 16 side and applies a load to the seat lower side. As a result, due to a part of the load, the panel rear side portions 52B move down toward the seat lower side. In addition, the cushion airbag 30 is set such that, during the expansion of the cushion airbag 30 in the occupant seated state, the upper surfaces 34U of the hip joint corresponding portions 34A of the rear side portions 34 have a step difference from and are lower than the upper surface 36U of the seat width direction center portion of the rear center portion 36. The setting for the respective push-up forces of the rear right and left regions A1, A3 and the rear center region A2 during the expansion of the cushion airbag 30 according to the embodiment is the same as the setting for the respective push-up forces of the rear right and left regions A1, A3 and the rear center region A2 during the expansion of the cushion airbag 30 (refer to FIG. 3) according to the first embodiment.

With the configuration, the setting for the respective push-up forces of the rear right and left regions A1, A3 and the rear center region A2 during the expansion of the cushion airbag 30 is the same as that of the first embodiment. Therefore, regarding the push-up during the expansion of the cushion airbag 30, the same operation and effects as those of the first embodiment can be obtained.

In the configuration according to the embodiment, in a case where a frontal collision of the vehicle in the occupant seated state is detected or estimated such that the inflator 22 (refer to FIG. 1) operates, the panel rear side portions 52B of the cushion panel 52 receive an expansion pressure of the cushion airbag 30 to move down further toward the seat lower side than at least the seat width direction center portion of the panel rear center portion 52A of the cushion panel 52. As described above, the cushion airbag 30 expands such that the upper surfaces 34U of the hip joint corresponding portions 34A of the rear side portions 34 have a step difference from and are lower than the upper surface 36U of the seat width direction center portion of the rear center portion 36. Accordingly, as in the first embodiment, the seat width direction center portion in the rear center portion 36 of the cushion airbag 30 is mainly pushed toward the recess portion between the lower ischium edges P3 in the hip bone PW of the seat occupant P, whereas the range of the seat occupant P from the hip joints P2 to the lower ischium edges P3 is not strongly pushed up. Therefore, the same effects as those of the first embodiment can be obtained.

In the embodiment, during the expansion of the cushion airbag 30 in the occupant seated state, the cushion panel 52 is deformed so as to allow the expansion of the rear side portions 34 of the cushion airbag 30 toward the seat lower side. During the expansion of the cushion airbag 30, a height position of upper surfaces (including the upper surfaces 34U of the hip joint corresponding portions 34A) of the rear side portions 34 of the cushion airbag 30 can be easily adjusted to be lower than a height position of the upper surface 36U of the seat width direction center portion of the rear center portion 36 of the cushion airbag 30. Further, in the embodiment, before the expansion of the cushion airbag 30, the cushion panel 52 is uniform, and there is no effect on sitting comfort.

A modification example of the third embodiment may be adopted in which, in portions of the cushion panel (52) other than the panel rear side portions (52B), other reinforcing structures such as a plurality of reinforcing beads that extends in the seat front-rear direction, or a plurality of reinforcing beads or ribs that protrudes toward the seat upper side are used instead of the reinforcing beads 54A, 54B, 54C.

Another modification example of the third embodiment may be adopted in which brittle portions (for example, hole portions such as slits, or thin portions) for reducing the stiffness of the panel rear side portions (52B) in the seat up-down direction are formed in the panel rear side portions (52B) without forming the reinforcing beads 54A, 54B, 54C. As a result, the panel rear side portions (52B) are set such that, in a case where the cushion airbag (30) expands in the occupant seated state, the panel rear side portions (52B) receive an expansion pressure of the cushion airbag (30) to move down further toward the seat lower side than at least the seat width direction center portion of the panel rear center portion (52A).

Supplement of Embodiments

A modification example of the second and third embodiments may be adopted in which a hole portion into which a part of the rear side portions (34) of the expanded cushion airbag (30) is inserted is formed in the panel rear side portions (42B, 52B).

In the embodiments, the cushion airbag 30 is formed in a rectangular shape in a plan view. However, the cushion airbag may be formed in another shape in which, for example, right and left side end portions of the rear portion of the cushion airbag correspond to the sewing lines of the sewn portions 38 shown in FIG. 1 in a plan view.

A modification example of the first embodiment may be adopted in which the expansion thickness of the rear side portions (34) in the seat up-down direction during the expansion of the cushion airbag (30) is restrained, for example, by connecting inner surfaces of the cushion airbag (30) to each other using a connecting member (for example, a string member) of the sewn portions 38 other than a sewing thread or a tether (not shown). As a result, the expansion thickness of the rear side portions (34) in the seat up-down direction during the expansion of the cushion airbag (30) is set to be less than the expansion thickness of the rear center portion (36) in the seat up-down direction during the expansion of the cushion airbag (30).

A modification example of the embodiments may be adopted in which, during the expansion of the cushion airbag in the occupant seated state, the cushion airbag is set such that, for example, upper surfaces of inner portions of the rear right and left regions (A1, A3) in the seat width direction have a step difference from and are lower than an upper surface of the seat width direction center portion of the rear center region (A2).

The rear stitched portions 60C shown in FIG. 10B have an arc shape. However, a modification example may be adopted in which, for example, the rear stitched portions are linear.

The embodiments and the modification examples may be appropriately combined.

Hereinabove, the examples of the disclosure have been described, but the disclosure is not limited thereto. In addition, various modifications can be made in a range not departing from the scope of the disclosure.

What is claimed is:

1. A vehicular seat comprising:
a cushion panel disposed to extend in a seat front-rear direction and to form a bottom portion of a seat cushion;
an inflator configured to operate to produce gas, the inflator being provided in the seat cushion; and
a cushion airbag configured to expand due to the gas supplied from the inflator and to push up a range including portions of a seat occupant from thighs to hip points in an expansion end state, the cushion airbag being provided over the cushion panel,
wherein the cushion airbag is set such that a push-up force in rear right and left regions corresponding to right and left hip joints to right and left lower ischium portions of the seat occupant in the expansion end state is lower than a push-up force in a rear center region present between the rear right and left regions in the expansion end state.

2. The vehicular seat according to claim 1, wherein:
the cushion airbag includes
a front portion that includes portions corresponding to the thighs of the seat occupant,
a pair of right and left rear side portions that is set in a range from hip joint corresponding portions that are portions corresponding to the hip joints of the seat occupant to lower ischium edge corresponding portions that are portions corresponding to lower ischium edges of the seat occupant, and
a rear center portion that is disposed between the right and left rear side portions; and
the cushion airbag is set such that, during the expansion of the cushion airbag in an occupant seated state, upper surfaces of the hip joint corresponding portions of the rear side portions are positioned with a step difference below, in a seat height direction, a center portion of an upper surface of the rear center portion in a seat width direction.

3. The vehicular seat according to claim 2, wherein an expansion thickness of the rear side portions in a seat up-down direction during the expansion of the cushion airbag is set to be less than an expansion thickness of the rear center portion in the seat up-down direction during the expansion of the cushion airbag.

4. The vehicular seat according to claim 3, wherein sewn portions or tethers are provided in right and left side portions of a rear portion of the cushion airbag, the sewn portions or the tethers connecting overlapping portions of the right and left side portions in the seat up-down direction to each other to restrict an expansion thickness of the rear side portions in the seat up-down direction during the expansion of the cushion airbag.

5. The vehicular seat according to claim 2, wherein:
the cushion panel includes
a panel rear center portion that is a portion corresponding to the rear center portion, and
panel rear side portions that are disposed outside of the panel rear center portion in the seat width direction; and
the panel rear side portions are positioned below, in the seat height direction, a center portion of the panel rear center portion in the seat width direction.

6. The vehicular seat according to claim 2, wherein:
the cushion panel includes
a panel rear center portion that is a portion corresponding to the rear center portion, and
panel rear side portions that are disposed outside of the panel rear center portion in the seat width direction; and
the panel rear side portions are set such that, in a case where the cushion airbag expands in the occupant seated state, the panel rear side portions receive an expansion pressure of the cushion airbag to move down below, in the seat height direction, the center portion of the panel rear center portion in the seat width direction.

7. The vehicular seat according to claim 1, wherein:
the inflator is disposed toward a seat front side in the cushion airbag;
the cushion airbag is formed by sewing a base cloth folded at the center such that portions of the base cloth overlap each other in an up-down direction;
a folded portion of the base cloth is disposed along a seat width direction to form a seat rear side end portion of the cushion airbag; and
a stitched portion of the cushion airbag includes
a pair of side stitched portions that is provided on opposite sides in the seat width direction and extends in the seat front-rear direction, and
a pair of rear stitched portions that extends toward an inner oblique rear side in the seat width direction from respective rear ends of the side stitched portions to a center portion of the folded portion in the seat width direction and has rear ends distant from each other.

8. A cushion airbag in which an inflator is accommodated in a seat front side in a state where the cushion airbag is mounted on a vehicular seat, and a push-up force in rear right and left regions corresponding to right and left hip joints to right and left lower ischium portions of a seat occupant of the vehicular seat in an expansion end state of the cushion airbag is set to be lower than a push-up force in a rear center region present between the rear right and left regions in the expansion end state, wherein:
- the cushion airbag is formed by sewing a base cloth folded at the center such that portions of the base cloth overlap each other in an up-down direction;
- a portion where the inflator is disposed is provided at a portion opposite to a folded portion side of the base cloth in the cushion airbag; and
- a stitched portion of the cushion airbag includes
  - a pair of side stitched portions that is provided on opposite sides in a first direction along an extending direction of the folded portion and extends along a second direction perpendicular to the first direction, and
  - a pair of rear stitched portions that extends obliquely from respective folded portion side end portions of the side stitched portions to a center portion of the folded portion in the first direction to move close to each other and has end portions positioned in the folded portion and distant from each other.

9. A vehicular seat comprising:
a cushion panel disposed to extend in a seat front-rear direction and to form a portion of a seat cushion;
an inflator configured to operate to produce gas, the inflator being connected to an inside of the seat cushion; and
a cushion airbag configured to expand due to the gas supplied from the inflator and to push up a range of the cushion panel including portions of a seat occupant from thighs to hip points at least in an expansion end state, the cushion airbag being provided over the cushion panel,
wherein the cushion airbag is set such that a first force at which the cushion airbag pushes up the cushion panel in rear right and left regions corresponding to right and left hip joints to right and left lower ischium portions of the seat occupant in the expansion end state is lower than a second force at which the cushion airbag pushes up the cushion panel in a rear center region present between the rear right and left regions in the expansion end state.

10. A cushion airbag in which an inflator is accommodated in a seat front side in a state where the cushion airbag is mounted on a vehicular seat, and a first force at which the cushion airbag pushes up rear right and left regions corresponding to right and left hip joints to right and left lower ischium portions of a seat occupant of the vehicular seat in an expansion end state of the cushion airbag is set to be lower than a second force at which the cushion airbag pushes up a rear center region present between the rear right and left regions in the expansion end state, the cushion airbag comprising:
- a base cloth folded at the center such that portions of the base cloth overlap each other in an up-down direction;
- a stitched portion obtained by sewing the base cloth; and
- a portion where the inflator is disposed, the portion being provided opposite to a folded portion side of the base cloth,
wherein the stitched portion includes
  - a pair of side stitched portions that is provided on opposite sides in a first direction along an extending direction of the folded portion and extends along a second direction perpendicular to the first direction, and
  - a pair of rear stitched portions that extends obliquely from respective folded portion side end portions of the side stitched portions to a center portion of the folded portion in the first direction to move close to each other and has end portions positioned in the folded portion and distant from each other.

* * * * *